UNITED STATES PATENT OFFICE.

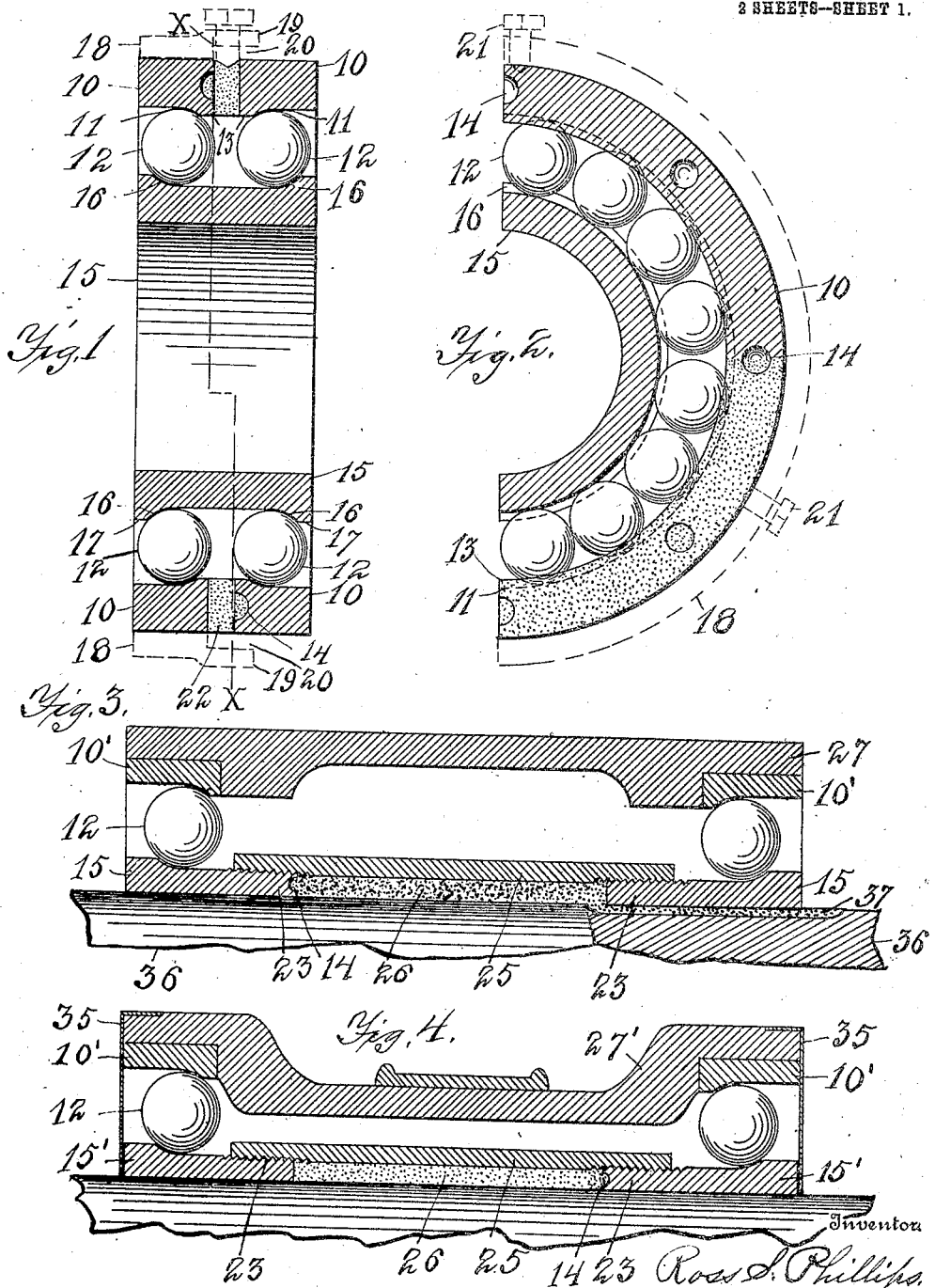

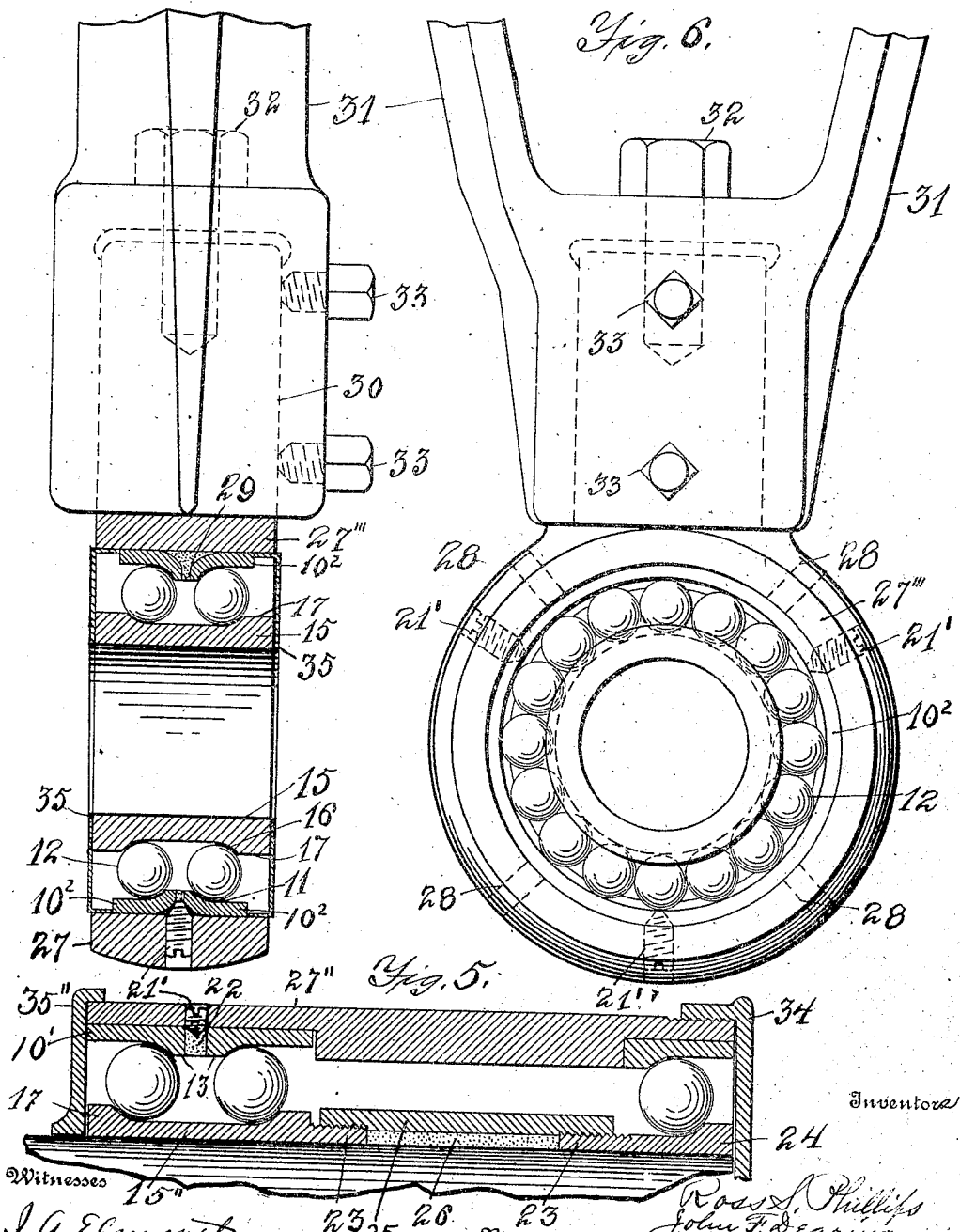

ROSS S. PHILLIPS, MILO HARRIS, AND JOHN F. DEARING OF JAMESTOWN, NEW YORK; SAID PHILLIPS ASSIGNOR TO HIRAM E. BUTLER, OF JAMESTOWN, NEW YORK.

BALL-BEARING.

No. 925,376.           Specification of Letters Patent.          Patented June 15, 1909.

Application filed April 15, 1907. Serial No. 368,228.

*To all whom it may concern:*

Be it known that we, ROSS S. PHILLIPS, MILO HARRIS, and JOHN F. DEARING, citizens of the United States, residing at Jamestown, county of Chautauqua, and State of New York, have invented certain new and useful Improvements in Ball-Bearings, of which the following, taken in connection with the accompanying drawings, is a full, clear, and exact description.

The invention relates to ball-bearings for heavy duty; and the objects of our invention are, first, to provide a novel method for assembling and holding the parts of ball-bearings in place; and second, to provide a simple, cheap, and durable means for adjusting the ball races to the balls and so securing them in the adjusted position as to make a perfect fit of the ball-race on the balls, and in such a manner also that the bearing may be taken apart for the insertion of new balls and readjusted with the same high degree of accuracy of adjustment between the parts.

In the drawings, Figure 1 is a crosswise sectional view of a bearing having two rows of balls, and showing our method of construction. Fig. 2 is a sectional view of one-half of the ball-bearing at line X X in Fig. 1. Fig. 3 is a sectional view of a modified form of the bearing with two rows of balls wide apart and showing our adjustable spreader; and Fig. 4 is a similar sectional view of a wide ball-bearing arranged for a common shop hanger and with closed ends; and Fig. 5 is a similar sectional view showing the adaptation of the bearing with three rows of balls to wheel hubs. Fig. 6 is a side elevation of a modification of the ball-bearing showing its adaptation to a shaft hanger; and Fig. 7 is a vertical sectional view of the modification of the bearing as attached to the lower end of the shaft hanger.

Similar numerals refer to corresponding parts in the several views.

The numeral 10 in Figs. 1 and 2 indicates the two hardened steel parts of the outer double race-ring having the ball-races 11 for balls 12 formed by the central annular projections 13 on the inner face. Said ring parts 10 are adjusted with a space between them and have the cup-like openings 14 on the adjacent faces, for a purpose hereinafter set forth. The numeral 15 indicates the inner race-ring which has the ball-races 16 on its outer face formed by the outer annular flange-like projections 17.

To assemble the bearing a full row of balls is inclosed between the inner ring 15 and one of the parts 10 of the outer ring, by turning the rings on their edges upon a suitable supporting surface. Then the other portion 10 of the outer ring is placed upon the first portion shutting down so far past the projection 17 as to allow of the insertion of the second row of balls. After having proceeded thus far in order to secure the high degree of accuracy necessary in the adjustment of the balls in the races, an independent assembling ring 18 is placed on the supporting surface. (See dotted lines in Fig. 1.) The ring 18 is a close fit to the outer side of the lower part 10 of the outer race-ring and extends up the width of part 10 in such close fit. It then extends out in an annular flange 19 which leaves an opening 20 adjacent to the ring 10 throughout its circumference. A number of set screws 21 having pointed inner ends are provided in the flange 19, the points extending into the opening between rings 10. The set screws 21 press the rings 10 apart until perfect adjustments of the races 11 and 16 are attained on the balls 12. After securing this perfect adjustment, the space 22 between the parts 10 of the outer ring is filled with fusible metal, that is, metal which melts at a low temperature such as Babbitt metal or the like, the cup-like openings 14 locking the fusible metal firmly in place. The inner space between the balls is protected by being packed with suitable material so that the fusible metal will not extend into the path of the balls. The assembling ring 18 is then removed and the projecting fusible metal on the outer side of the ring is cut away, after which the outer faces may be properly ground and the bearing is ready to be placed in a suitable housing. The fusible metal holds the perfect accuracy of fit of the race-ways on the balls attained by the set screw 21.

In the modified forms of bearings shown in Figs. 3, 4, and 5 the screw method of adjustment is adapted to bearings having permanent outer housings 27, 27', and 27'' and either two or three rows of balls widely separated and upon either or both rings 10'. This is accomplished by extension 23 at one side of the inner race-ways 15, 15' or 15''. The other portion of the inner ring 15, 15' or 15'' having a similar threaded projection 23 extending toward projection 23 on the first part of said ring. A cylindrical ring 25 is provided with threads on its inner surface to engage projections 23 and act as a spreader for the two parts of the inner rings, by means of which the ball races and balls may be adjusted with great accuracy. A temporary shaft 36 is inserted through said rings, which shaft has a lengthwise slot 37 under one of the rings 15, as shown in Fig. 3. The space 26 between the ends of extensions 23 is filled with fusible metal through slot 37, thereby locking the rings firmly in place in practically the same manner as shown in Figs. 1 and 2; the fusible metal locking into the thread and cups 14, as shown in Figs. 3 and 4, and thereby forming an absolute lock for the parts so that they cannot get out of adjustment and rendering permanent that perfect fit which is so necessary to the proper working of a ball-bearing. In Fig. 5 is shown the application of this principle to the hubs of wheels, as in wagons, automobiles and like vehicles, in which a double ball-bearing is placed at the rear of the hub and a single bearing at the outer end, the two sections being connected by the adjusting ring 25 as above described.

In the modification shown in Figs. 6 and 7 a simple and cheap form of our ball-bearing is shown as applied to a shaft hanger. In this form the parts 10² are made from sheet steel in the form of steel stampings and supported by a permanent outer ring or housing 27‴, the inner edge of rings 10² being turned up in races 11 by means of a suitable die. The pointed set screws 21′ are inserted in the outer ring 27‴ so that the parts 10² may be adjusted to a high degree of accuracy upon balls 12. Openings 28 are provided in outer ring 27‴ through which the fusible metal is poured thereby filling the space 29 between the parts 10² and the outer ring 27‴ which space corresponds to the opening 22 as shown in Fig. 1. The fusible metal serves the same purpose of locking the parts of the ring firmly in place, supporting the same, and rendering permanent the fit of the rings on the balls. This form of a bearing is assembled in much the same manner as above described for the form shown in Fig. 1. For use on shafting the outer ring 27‴ has a stem 30 which is inserted in an opening in the lower end of a hanger 31 and vertically held and adjusted therein by means of a bolt 32 after which it is fixed in position by means of set screws 33.

It is important that the bearings should be protected from dust and dirt whether used on vehicles or shafting. Accordingly a screw cap closure 34 is provided for the outer ends of vehicle bearings as shown in Fig. 5, the inner end being closed by flanged ring 35″. A simple modification 35 of this ring 35″ is shown in the sheet metal stamping covered for the ends of the bearing shown in Fig. 4, or a convenient form of this cap is shown for shaft bearing in section in Fig. 7.

We claim as new:—

1. A race-ring for ball-bearings composed of two hardened ring parts having a central annular space between them, each of said ring parts having a complete ball race thereon, and a seal of soft metal in said space to hold said rings in an adjusted relation.

2. A race-ring for ball-bearings composed of two ring parts having a central annular space between them, each of said ring parts having a complete race-way for balls thereon, said ring parts adjusted as to one another, and a bond of fusible metal in said space to hold said ring parts in the adjusted relation.

3. A race-ring for ball-bearings composed of two ring parts having a space between them, each of said ring parts having a ball race thereon, each of said ring parts having locking openings in the side adjacent to said space, said ring parts adjusted as to one another, and a bond of fusible metal in said space and locking openings to hold said ring parts in the adjusted relation.

4. A race-ring for ball-bearings composed of a plurality of ring parts, each of said ring parts having a ball race thereon, means for adjusting the relation of said ring parts as to one another, and a seal of fusible metal between said ring parts to render said adjustment permanent.

5. A race-ring for ball-bearings composed of two ring parts having an annular space between them, each of said ring parts having a ball-race thereon, a threaded element to adjust the relation of said races, and fusible metal in said space to hold said ring parts in the adjusted relation.

6. A race-ring for ball-bearings composed of two ring parts, each of said parts having a ball race thereon, a screw adjusting means for said ring parts, and a seal of fusible metal between said ring parts to make said adjustment permanent.

7. In a ball-bearing composed of hardened steel rings having ball races on their adjacent sides, balls in said races, one of said steel rings formed in two ring parts having an annular space between them, a threaded adjusting means for said ring parts, and a seal of fusible metal in said space to render permanent the adjusted relation of said ring parts.

8. In ball-bearings, hardened steel race-rings having ball-races on their adjacent sides, balls in said races, one of said rings formed in two ring parts having a space between them, means for adjusting the width of said space, and a bond of fusible metal in said space to secure the said ring parts in the adjusted position.

9. In a ball-bearing, an inner race ring having race-ways on its outer surface, an outer race-ring having race-ways on its inner surface, one of said rings composed of two ring parts having an annular space between them, each of said parts having a race-way thereon, balls in said race-way, means for adjusting the relation of said ring parts to the balls, and fusible metal in the said annular space to hold the bearing in the adjusted relation.

10. In ball-bearings, hardened steel race-rings having ball-races on their adjacent sides, balls in said races, one of said rings formed in two ring parts having a space between them, means for adjusting the width of said space, and metal in said space interlockingly engaging the adjacent sides of the two ring parts to secure them in the adjusted position.

In testimony whereof we have signed our names to this specification in the presence of two subscribing witnesses.

ROSS S. PHILLIPS.
     MILO HARRIS.
     JOHN F. DEARING.

Witnesses:
 A. W. KETTLE,
 I. A. ELSWORTH.